(12) United States Patent
Steinmetz et al.

(10) Patent No.: US 7,939,596 B2
(45) Date of Patent: May 10, 2011

(54) AQUEOUS COATING MATERIAL, METHOD FOR THE PRODUCTION THEREOF, AND USE THEREOF

(75) Inventors: Bernhard Steinmetz, Rütschenhausen (DE); Michaela Ebert, Würzburg (DE); Elke Röhr, Zell (DE); Berthold Deppisch, Riedenheim (DE); Gerd Hückmann, Würzburg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 12/097,374

(22) PCT Filed: Dec. 13, 2006

(86) PCT No.: PCT/EP2006/012020
§ 371 (c)(1),
(2), (4) Date: May 26, 2009

(87) PCT Pub. No.: WO2007/073871
PCT Pub. Date: Jul. 5, 2007

(65) Prior Publication Data
US 2009/0270548 A1    Oct. 29, 2009

(30) Foreign Application Priority Data

Dec. 16, 2005 (DE) .................. 10 2005 060 302

(51) Int. Cl.
C08L 51/00 (2006.01)
C08L 75/04 (2006.01)
C08L 83/04 (2006.01)
C08L 53/00 (2006.01)

(52) U.S. Cl. ........ 524/504; 524/590; 524/588; 524/505; 524/109

(58) Field of Classification Search .................. 524/109, 524/504, 590, 588, 505
See application file for complete search history.

(56) References Cited

U.S. PATENT DOCUMENTS 6,309,707 B1 * 10/2001 Mayer et al. ............... 427/386
6,649,138 B2 * 11/2003 Adams et al. ............... 423/403
2004/0167252 A1 * 8/2004 Melchiors et al. ............ 524/13

FOREIGN PATENT DOCUMENTS

| DE | 4009858 A1 | 10/1991 |
|----|-----------|---------|
| DE | 44 21 823 A | 1/1996 |
| DE | 44 37 535 A | 4/1996 |
| DE | 195 28 878 A | 2/1997 |
| DE | 19914098 A1 | 9/2000 |
| DE | 19930665 A1 | 1/2001 |
| DE | 10004494 A1 | 8/2001 |
| DE | 10043405 C1 | 6/2002 |
| DE | 10 2004 013729 A | 10/2005 |
| DE | 19948004 B4 | 5/2006 |
| EP | 0 452 786 A | 10/1991 |
| EP | 0228003 B2 | 3/1994 |
| EP | 0634431 B1 | 1/1999 |
| EP | 1 717 284 A | 11/2006 |
| WO | WO9115528 A1 | 10/1991 |
| WO | WO9215405 A1 | 9/1992 |
| WO | 2004/076506 A | 9/2004 |
| WO | WO 2006089940 A1 * | 8/2006 |

OTHER PUBLICATIONS

International Search Report dated Nov. 29, 2007 for PCT/EP2006/012020.
Written Opinion of the International Searching Authority for PCT/EP2006/012020.
International Preliminary Report on Patentability for PCT/EP2006/012020 dated Jul. 8, 2008.

* cited by examiner

Primary Examiner — Michael M Bernshteyn
(74) Attorney, Agent, or Firm — Cantor Colburn LLP

(57) ABSTRACT

Disclosed herein is an aqueous coating material comprising (A) at least one polyurethane which is ionically stabilized, nonionically stabilized, or a combination thereof, and which is saturated, unsaturated, grafted with olefinically unsaturated compounds, or a combination thereof, (B) at least one wetting agent or dispersant; and (C) at least one organic solvent selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, solutions of trimethylolpropane, solutions of pentaerythritol, solutions of sorbitol, reactive polyether polyols with a number-average molecular weight of 110 to 6000 daltons and a hydroxyl number of 25 to 1000 mg KOH/g, propylene glycol monobutyl ether, dipropylene glycol dimethyl ether, glycerol ethoxylate, ethyl 3-ethoxypropionate, gamma-butyrolactone, N-(2-hydroxyethyl)piperidine, N-methylmorpholine, N-(2-hydroxyethyl)morpholine, N-acetylmorpholine, N-cyclohexylpyrrolidone, N-octyl-2-pyrrolidone, and a combination thereof. Also disclosed is a process for preparing the foregoing aqueous coating material.

18 Claims, No Drawings

AQUEOUS COATING MATERIAL, METHOD FOR THE PRODUCTION THEREOF, AND USE THEREOF

CROSS REFERENCE TO RELATED APPLICATIONS

This Application is the National Stage of International Application No. PCT/EP2006/012020, filed Dec. 13, 2006, which claims priority to German Application No. 10 2005 060 302.5, filed Dec. 16, 2005.

FIELD OF THE INVENTION

The present invention relates to a new coating material. The present invention also relates to a new process for preparing an aqueous coating material. The present invention additionally relates to the use of the new coating material and of the aqueous coating material prepared by the new process.

BACKGROUND

Aqueous coating materials comprising at least one ionically and/or nonionically stabilized polyurethane which is saturated, unsaturated and/or grafted with olefinically unsaturated compounds are known. They may be cured physically, thermally, or both thermally and with actinic radiation. Preferably they comprise color and/or effect pigments and are used for producing color and/or effect paint systems, especially basecoats as part of multicoat paint systems, or solid-color topcoats.

The known aqueous coating materials may comprise organic solvents, especially high-boiling ("long") organic solvents, such as heterocyclic, aliphatic or aromatic hydrocarbons, mono- or polyhydric alcohols, ethers, esters, and ketones, such as N-methylpyrrolidone, toluene, xylene, butanol, ethylene glycol and butyl glycol and their acetates, butyl diglycol, ethylene glycol dibutyl ether, diethylene glycol dibutyl ether, ethoxypropanol, cyclohexanone, methyl ethyl ketone, acetone or isophorone (cf. European patent applications EP 0 228 003 A1 and EP 0 634 431 A1).

Among these solvents, N-methylpyrrolidone in particular effectively prevents the formation of spray mist bittiness.

From German patent DE 100 43 405 C1 it is known to add triorganophosphates, particularly trialkyl and/or tricycloalkyl phosphates such as tripropyl, tributyl, triamyl, trihexyl or tricyclohexyl phosphate, to the aqueous coating materials in order to increase the water-vapor permeability of the applied coating materials and to lessen their tendency to form pops and pinholes.

Among these triorganophosphates, tributyl phosphate has proven particularly effective.

Nevertheless, in practice, N-methylpyrrolidone and tributyl phosphate give rise to toxicological problems, and so attempts are being made to replace them by compounds at least as effective if not, indeed, more effective, but free of such toxicological problems.

SUMMARY

The object on which the present invention is based is to provide a new aqueous coating material comprising at least one ionically and/or nonionically stabilized polyurethane which is saturated, unsaturated and/or grafted with olefinically unsaturated compounds, said coating material being easy to prepare, no longer containing any toxicologically objectionable ingredients, and exhibiting, following spray application, very few, if any, spray mist bits, pops or pinholes.

The new aqueous coating material ought in particular to be suitable as an aqueous basecoat material for producing color and/or effect basecoats of multicoat paint systems by the wet-on-wet method. The applied aqueous basecoat film ought to be wetted particularly effectively by the clearcoat material.

The new aqueous coating material ought to provide coatings, preferably color and/or effect coatings, more preferably basecoats and solid-color topcoats, especially basecoats in multicoat paint systems, which are completely or very largely free from film defects such as spray mist bits, pops, and pinholes.

Found accordingly has been the new aqueous coating material comprising (A) at least one ionically and/or nonionically stabilized polyurethane which is saturated, unsaturated and/or grafted with olefinically unsaturated compounds,
(B) at least one wetting agent or dispersant, and
(C) at least one organic solvent selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, solutions of trimethylolpropane, solutions of pentaerythritol, solutions of sorbitol, reactive polyether polyols with a number-average molecular weight of 110 to 6000 daltons and a hydroxyl number of 25 to 1000 mg KOH/g, propylene glycol monobutyl ether, dipropylene glycol dimethyl ether, glycerol ethoxylate, ethyl 3-ethoxypropionate, gamma-butyrolactone, N-(2-hydroxyethyl) piperidine, N-methylmorpholine, N-(2-hydroxyethyl) morpholine, N-acetylmorpholine, N-cyclohexylpyrrolidone, and N-octyl-2-pyrrolidone, which is referred to below as the "coating material of the invention".

Also found has been the new process for preparing the coating material of the invention, in which at least (A) at least one ionically and/or nonionically stabilized polyurethane which is saturated, unsaturated and/or grafted with olefinically unsaturated compounds,
(B) at least one wetting agent or dispersant, and
(C) at least one organic solvent selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, solutions of trimethylolpropane, solutions of pentaerythritol, solutions of sorbitol, reactive polyether polyols with a number-average molecular weight of 110 to 6000 daltons and a hydroxyl number of 25 to 1000 mg KOH/g, propylene glycol monobutyl ether, dipropylene glycol dimethyl ether, glycerol ethoxylate, ethyl 3-ethoxypropionate, gamma-butyrolactone, N-(2-hydroxyethyl) piperidine, N-methylmorpholine, N-(2-hydroxyethyl) morpholine, N-acetylmorpholine, N-cyclohexylpyrrolidone, and N-octyl-2-pyrrolidone are mixed with water and the resulting mixture is homogenized, this being referred to below as the "process of the invention".

Found not least has been the new use of the coating material of the invention, and of the coating material prepared by the process of the invention, for producing new thermoplastic or thermoset materials, this being referred to below as "use in accordance with the invention".

Additional subject matter of the invention will become apparent from the description.

DETAILED DESCRIPTION

In the light of the prior art it was surprising and unforeseeable for the skilled worker that the object on which the present invention was based could be achieved by means of the coating material of the invention, the process of the invention, and the use in accordance with the invention.

In particular it was surprising that the coating material of the invention was easy to prepare, no longer contained any toxicologically objectionable ingredients, and, following spray application, exhibited very few, if any, spray mist bits, pops or pinholes.

Surprisingly it was possible to use the coating material of the invention in the context of use in accordance with the invention for producing thermoplastic and thermoset materials, especially thermoset materials, of the invention, having outstanding performance properties. The thermoplastic and thermoset materials of the invention were outstandingly useful as coatings, adhesive layers, seals, sheets, and moldings of the invention, preferably coatings of the invention.

The coating material of the invention is suitable in a particularly outstanding manner as an aqueous basecoat material for producing color and/or effect basecoats of multicoat paint systems by the wet-on-wet method. In this utility the applied aqueous basecoat film was wetted particularly effectively by the clearcoat material.

In the context of its use in accordance with the invention, the coating material of the invention provided coatings of the invention, preferably color and/or effect coatings of the invention, more preferably basecoats and solid-color topcoats, particularly basecoats in multicoat paint systems, which were completely or very largely free from film defects such as spray mist bits, pops, and pinholes. Additionally they exhibited particularly high hiding power and an outstanding overall appearance. The coating material of the invention was therefore outstandingly suitable for the finishing of automobile bodies.

The coating material of the invention is curable physically, thermally, or both thermally and with actinic radiation. The thermal curing, or thermal and actinic radiation curing, may be assisted by physical curing.

In the context of the present invention the term "physical curing" denotes the curing of a layer of a coating material by filming, where appropriate after the layer has dried. Normally no crosslinking agents are needed for this purpose. Physical curing may where appropriate be assisted by atmospheric oxygen or by exposure to actinic radiation.

In the context of the present invention the term "thermal curing" denotes the heat-initiated curing of a layer of a coating material, for which normally a separate crosslinking agent is employed. The crosslinking agent contains reactive functional groups which are complementary to the reactive functional groups present in the polyurethanes (A). This is normally referred to by those in the art as external crosslinking. Where the complementary reactive functional groups or autoreactive functional groups, i.e., groups which react "with themselves", are already present in the polyurethanes (A), they are self-crosslinking. Examples of suitable complementary reactive functional groups and autoreactive functional groups are known from German patent application DE 199 30 665 A1, page 7, line 28, to page 9, line 24.

In the context of the present invention actinic radiation means electromagnetic radiation such as near infrared (NIR), visible light, UV radiation, X-rays or gamma radiation, especially UV radiation, and particulate radiation such as electron beams, beta radiation, alpha radiation, proton beams or neutron beams, especially electron beams. Curing by UV radiation is normally initiated by means of free-radical or cationic photoinitiators.

Where thermal curing and curing with actinic light are employed together in the context of one coating material of the invention, the term "dual cure" is also used.

The coating material of the invention may be a one-component (1K) system.

In the context of the present invention a one-component (1K) system is a thermosetting coating material in which the binder and crosslinking agent are present alongside one another, i.e., in one component. A precondition for this is that the two ingredients undergo crosslinking with one another only at relatively high temperatures and/or when exposed to actinic radiation.

The coating material of the invention may also be a two-component (2K) or multicomponent (3K, 4K) system.

In the context of the present invention this means a coating material in which in particular the binder and the crosslinking agent are present separately from one another in at least two components which are not combined until shortly before application. This form is chosen when binder and crosslinking agent react with one another even at room temperature. Coating materials of this kind are employed in particular for coating thermally sensitive substrates, particularly in automotive refinish.

The first essential ingredient of the coating material of the invention is at least one, especially one, ionically and/or nonionically stabilized polyurethane (A) which is saturated, unsaturated and/or grafted with olefinically unsaturated compounds and is based preferably on aliphatic, cycloaliphatic, aliphatic-cycloaliphatic, aromatic, aliphatic-aromatic and/or cycloaliphatic-aromatic polyisocanates. For the purpose of stabilization the polyurethane (A) contains alternatively (a1) functional groups which can be converted into cations by neutralizing agents and/or quaternizing agents, and/or cationic groups, or (a2) functional groups which can be converted into anions by neutralizing agents, and/or anionic groups, and/or (a3) nonionic hydrophilic groups.

Suitable polyurethanes (A) are known for example from

German patent application DE 199 14 98 A1, column 1, lines 29 to 49, and column 4, line 23, to column 11, line 5, German patent application DE 199 48 004 A1, page 4, line 19, to page 13, line 48, European patent application EP 0 228 003 A1, page 3, line 24, to page 5, line 40, European patent application EP 0 634 431 A1, page 3, line 38, to page 8, line 9, or international patent application WO 92/15405, page 2, line 35, to page 10, line 32.

In the coating material of the invention they are present in the customary and known amounts.

Where the coating material of the invention is curable physically, thermally with self-crosslinking, or both thermally with self-crosslinking and with actinic radiation, the amount therein of polyurethanes (A) is preferably 50% to 100%, more preferably 50% to 90%, and in particular 50% to 80% by weight, based in each case on the film-forming solids of the coating material of the invention.

Where the coating material of the invention is curable thermally with external crosslinking, or both thermally with external crosslinking and with actinic radiation, the amount therein of polyurethanes (A) is preferably 10% to 80%, more preferably 15% to 75%, and in particular 20% to 70% by weight, based in each case on the film-forming solids of the coating material of the invention.

In the context of the present invention the film-forming solids means the sum of all ingredients of the coating material of the invention that constitute the solids of the thermoplastic or thermoset materials of the invention that are produced from said coating material; preferably of the thermoplastic or thermoset coatings, adhesive layers, seals, sheets, and moldings of the invention, and particularly of the thermoset coatings of the invention.

The second essential ingredient of the coating material of the invention is at least one wetting agent or dispersant (B) selected from the group consisting of hyperbranched polymers, polyether-modified polydimethylsiloxanes, ionic and nonionic (meth)acrylate copolymers, high molecular mass block copolymers containing groups having pigment affinity, and dialkylsulfosuccinates. Hyperbranched polymers are used in particular.

The wetting agent or dispersants (B) are conventional, commercially available materials and are sold, for example, by Cognis under the brand names Starfactant® 20 and Hydropalat® 875, by Byk Chemie under the brand names Disperbyk® 162, 163 and 182 and Byk® 348, 355, 381 and 390, by Coatex under the brand names Coatex® P90 and BP3, and by Efka under the brand name Efka® 4580. Starfactant® 20 is used in particular.

The wetting agents or dispersants (B) are used in the customary and known, effective amounts. Preferably they are used in an amount of 0.01% to 5%, more preferably 0.05% to 2.5%, and in particular 0.1% to 1.5% by weight, based in each case on the coating material of the invention.

The third essential ingredient of the coating material of the invention is at least one, especially, organic solvent (C) selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, solutions of trimethylolpropane, solutions of pentaerythritol, solutions of sorbitol, reactive polyether polyols with a number-average molecular weight of 110 to 6000 daltons and a hydroxyl number of 25 to 1000 mg KOH/g, propylene glycol monobutyl ether, dipropylene glycol dimethyl ether, glycerol ethoxylate, ethyl 3-ethoxypropionate, gamma-butyrolactone, N-(2-hydroxyethyl)piperidine, N-methylmorpholine, N-(2-hydroxyethyl) morpholine, N-acetylmorpholine, N-cyclohexylpyrrolidone, and N-octyl-2-pyrrolidone.

The organic solvents are customary and known, commercially available products. For example, the reactive polyetherpolyols are sold under the brand name Lupranol® by Elastogran, dipropylene glycol dimethyl ether under the brand name Proglyde® DMM by Dow, propylene glycol monobutyl ether by BASF Aktiengesellschaft under the brand name Solvenon® PnB, or glycerol ethoxylate by HugoHäffner Gruppe under the trade name Weichmachungsmittel 9.

Preference is given to using 2-methyl-1-butanol, diethylene glycol, glycerol, triethylene glycol, N-(2-hydroxyethyl) morpholine, 1,6-hexanediol, polyether polyols having a number-average molecular weight of 110 to 1000 daltons, and glycerol ethoxylate, particularly triethylene glycol.

The amount of organic solvent (C) may vary widely and thus may be tailored to the requirements of the case in hand. In view of the aqueous nature of the coating material of the invention, however, efforts are made to minimize the amount therein of organic solvent (C). In this context it is a particular advantage that an organic solvent (C) content of 0.1% to 10%, preferably 0.5% to 7%, and in particular 0.5% to 5% by weight in the coating material of the invention, based in each case on the coating material of the invention, is sufficient to achieve the advantageous technical effects of the invention.

Furthermore, the coating material of the invention may also comprise at least one additive (D). Preferably it comprises at least two additives (D). The additive (D) is preferably selected from the group of additives which are customarily used within the coating materials field. With particular preference the additive (D) is selected from the group consisting of salts which can be decomposed thermally without residue or substantially without residue; binders curable physically, thermally and/or with actinic radiation that are different from the polyurethanes (A); crosslinking agents; organic solvents other than the organic solvents (C); thermally curable reactive diluents; reactive diluents curable with actinic radiation; color and/or effect pigments; transparent pigments; fillers; molecularly dispersely soluble dyes; nanoparticles; light stabilizers; antioxidants; devolatilizers; emulsifiers; slip additives; polymerization inhibitors; free-radical polymerization initiators; thermolabile free-radical initiators; adhesion promoters; flow control agents; film-forming assistants, such as thickeners and structurally viscous sag control agents, SCAs; flame retardants; corrosion inhibitors; free-flow aids; waxes; siccatives; biocides; and matting agents.

Suitable additives (D) of the aforementioned kind are known for example from

German patent application DE 199 48 004 A1, page 14, line 4, to page 17, line 5, German patent application DE 199 14 98 A1, column 11, line 9, to column 15, line 63, or German patent DE 100 43 405 C1, column 5, paragraphs [0031] to [0033].

They are employed in the customary and known, effective amounts.

The solids content of the coating material of the invention may vary very widely and so may be tailored to the requirements of the case in hand. Primarily the solids content is guided by the viscosity which is needed for the application, particularly spray application, and so it can be adjusted by the skilled worker on the basis of his or her general art knowledge, with the assistance where appropriate of a few guideline tests. Preferably the solids content is 5% to 70%, more preferably 10% to 65%, and in particular 15% to 60% by weight, based in each case on the coating material of the invention.

The coating material of the invention is prepared preferably by means of the process of the invention. In that process the above-described ingredients (A), (B), and (C) and also, where appropriate, (D) are dispersed in an aqueous medium, in particular in water, and then the resulting mixture is homogenized. Viewed in terms of method, the process of the invention has no peculiarities but may instead be carried out by means of the customary and known mixing methods and mixing apparatus, such as stirred tanks, dissolvers, agitator mills, compounders, static mixers or extruders.

On account of the numerous particular advantages of the coating material of the invention and of the coating material of the invention prepared by means of the process of the invention, the said coating materials can be put to numerous end uses. With preference they are used for producing the thermoplastic and thermoset, especially thermoset, materials of the invention. More preferably they are used as coating materials, adhesives, sealants, and precursors for sheets and moldings, of the invention, for producing the thermoplastic and thermoset, especially thermoset, coatings, adhesive layers, seals, sheets, and moldings of the invention, with particular preference coatings, which can be joined fixedly or redetachably to primed and unprimed substrates of all kinds.

In particular the coatings, adhesive layers, and seals of the invention are joined fixedly to the substrates.

Examples of suitable substrates are known from
German patent application DE 199 48 004 A1, page 17, lines 12 to 36, or
German patent DE 100 43 405 C1, column 2, paragraph [0008], to column 3, paragraph [0017].

With particular preference the coating materials of the invention are used as solid-color topcoat materials for producing single-coat solid-color topcoats, or as aqueous basecoat materials for producing multicoat color and/or effect paint systems. With very particular preference they are used as aqueous basecoat materials for producing color and/or effect basecoats of multicoat paint systems, preferably multicoat paint systems for automobile bodies. In these utilities they are suitable outstandingly for the OEM (original) finishing and for refinishing.

With very particular preference the multicoat paint systems of the invention are produced by wet-on-wet methods in which
(1) at least one aqueous basecoat material is applied to a primed or unprimed substrate to give at least one aqueous basecoat film (1),
(2) at least one clearcoat material is applied to the aqueous basecoat film (1) to give at least one clearcoat film (2), and
(3) at least the aqueous basecoat film(s) (1) and the clearcoat film(s) (2) are jointly cured, to give the basecoat (1) and the clearcoat (2).

Examples of such wet-on-wet methods are known from
German patent application DE 199 48 004 A1, page 17, line 37, to page 19, line 22, or
German patent DE 100 43 405 C1, column 3, paragraph [0018], and column 8, paragraph [0052], to column 9, paragraph [0057], in conjunction with column 6, paragraph [0039], to column 8, paragraph [0050].

The film thicknesses employed for the individual coats of the multicoat paint system of the invention are those described in said patent/patent application.

In view of the outstanding performance properties of the coating material of the invention the thermoplastic and thermoset materials of the invention that are produced from it likewise display an outstandingly balanced profile of physicochemical, optical, and mechanical properties. Consequently the sheets and moldings of the invention, and the substrates coated with the coatings of the invention, bonded with the adhesive layers of the invention, sealed with the seals of the invention, covered with the sheets of the invention and/or joined to the moldings of the invention also have a particularly high service value and a particularly long service life.

EXAMPLES

Preparation Example 1

The Preparation of a Gray Aqueous Basecoat Material 1

For better assessment of any film defects appearing, a gray aqueous basecoat material was used, prepared in accordance with the following specification:

Mixture 1a:
In a dissolver was charged with 26 parts by weight of an inorganic thickener (sodium magnesium phyllosilicate, 3% strength by weight in water). Added to this initial charge then with stirring were 30 parts by weight of deionized water, 107.5 parts by weight of butyl glycol, 4.5 parts by weight of a polyurethane-modified polyacrylate prepared in accordance with page 7, line 55, to page 8, line 23, of German patent application DE 44 37 535 A1, and 0.6 part by weight of a 20.5% strength by weight solution of a commercial defoamer Nopco® DSX 1550. This gave the mixture 1a.

Mixture 1b:
Separately therefrom, 3.2 parts by weight of an aqueous polyester resin dispersion prepared in accordance with Example D., column 16, lines 37 to 59, of German patent application DE 40 09 858 A1, 0.3 part by weight of a surfactant solution containing 52% by weight of Surfynol® 104 from Air Products, 55 parts by weight of butyl glycol, 4.1 parts by weight of a commercial, water-dilutable melamine-formaldehyde resin in n-butanol (Cymel® 203 from Surface Specialties Austria) and 0.3 part by weight of a 10% strength by weight solution of dimethylethanolamine in water were mixed with one another. This gave the mixture 1b.

Mixture 1c:
Mixtures 1a and 1b were mixed with one another. This gave the mixture 1c.

Mixture 1d:
Mixture 1c was admixed with 6 parts by weight of deionized water, 20.4 parts by weight of a polyurethane-modified polyacrylate prepared in accordance with page 19, line 44, to page 20, line 7 of German patent application DE 199 48 004 A1, 1.6 parts by weight of a surfactant solution containing 52% by weight of Surfynol® 104, 48 parts by weight of butoxyethanol, 0.4 part by weight of a 10% strength by weight solution of dimethylethanolamine in water, 1.6 parts by weight of n-butanol and 3.9 parts by weight of a 3% strength by weight solution of a polyacrylate thickener (Viscalex® from Ciba). This gave the mixture 1d.

Carbon Black Paste:
The carbon black paste was prepared from 25 parts by weight of a polyacrylate dispersion prepared in accordance with international patent application WO 91/15528, 10 parts by weight of carbon black, 0.1 part by weight of methyl isobutyl ketone, 1.36 parts by weight of dimethylethanolamine, 2 parts by weight of a commercial polyether (Pluriol® P900 from BASF Aktiengesellschaft) and 61.45 parts by weight of deionized water.

Blue Paste 1:
Blue paste 1 was prepared from 19.4 parts by weight of a polyurethane dispersion prepared in accordance with column 16, lines 10 to 35, of German patent application DE 40 09 858 A1, 13.5 parts by weight of Paliogen® Blue L 6482, 4.3 parts by weight of butoxyethanol, 0.18 part by weight of methyl ethyl ketone, 0.62 part by weight of dimethylethanolamine, 1.2 parts by weight of Pluriol® P900 and 61 parts by weight of water.

Blue Paste 2:
Blue paste 2 was prepared from 15.4 parts by weight of a polyacrylate dispersion prepared in accordance with international patent application WO 91/15528, 30 parts by weight of Paliogen® Blue L 6470, 2.6 parts by weight of Disperbyk® 184, 1.6 parts by weight of dipropylene glycol monomethyl ether, 0.1 part by weight of methyl isobutyl ketone, 0.65 part by weight of dimethylethanolamine, 0.8 part by weight of 1,2-propylene glycol and 45 parts by weight of deionized water.

Violet Paste:
The violet paste was prepared from 23 parts by weight of an aqueous polyurethane dispersion prepared in accordance with Example 1, page 14, line 13, to page 15, line 27 of international patent application WO 92/15405, 18.4 parts by weight of Quindo Violet® 19 228-6902, 5 parts by weight of butyl glycol, 0.2 part by weight of methyl ethyl ketone, 0.26 part by weight of dimethylethanolamine, 2 parts by weight of Pluriol® P900 and 51 parts by weight of deionized water.

Paste Mixture:

The paste mixture was prepared from 2.5 parts by weight of the carbon black paste, 1 part by weight of Blue paste 1, 0.3 part by weight of Blue paste 2, 0.75 part by weight of the Violet paste, and 0.5 part by weight of a paste prepared in accordance with Example 1 of German patent application DE 100 04 494 A1.

Mixture 1e:

The mixture 1e was prepared from the paste mixture and mixture 1d.

Aluminum Effect Pigment Paste:

The aluminum effect pigment paste was prepared from 0.18 part by weight of a first, 65% by weight aluminum effect pigment suspension (Alu-Stapa-Hydrolux® 2153 from Eckart) and of a second, 65% by weight aluminum effect pigment suspension (Alu-Stapa-Hydrolux 8154 from Eckart), 0.55 part by weight of butyl glycol and 0.28 part by weight of the aqueous polyester resin dispersion prepared in accordance with Example D., column 16, lines 37 to 59, of German patent application DE 40 09 858 A1.

Aqueous Basecoat Material 1:

The aqueous basecoat material 1 was prepared from mixture 1e, the aluminum effect pigment paste, and two parts by weight of water. It was subsequently adjusted with dimethylethanolamine to a pH of 8 and with deionized water to a viscosity of 58 mPas under a shearing load of 1000/second at 23° C.

Examples 1 to 7 (Inventive) and C1 (Comparative)

The Preparation of Aqueous Basecoat Materials 2 to 8 (Examples 1 to 7) and of Aqueous Basecoat Material C1 (Example C1)

Aqueous Basecoat Material C1:

Aqueous basecoat material C1 was prepared by adding 0.5% by weight of N-methylpyrrolidone to the aqueous basecoat material 1 from preparation example 1.

Aqueous basecoat materials 2 to 8 were prepared by adding the organic solvents (C) and wetting agents or dispersants (B) specified in Table 1 to the aqueous basecoat material 1 from preparation example 1.

The percentages by weight of Table 1 are based on the respective aqueous basecoat material.

Examples 8 to 14 (Inventive) and C2 (Comparative)

The Production of Multicoat Paint Systems 2 to 8 (Examples 8 to 14) and of Multicoat Paint System C1 (Example C2)

The multicoat paint system C1 of example C2 was produced using the aqueous basecoat material C1 from example C1.

The multicoat paint systems 2 to 8 of examples 8 to 14 were produced using the aqueous basecoat materials 2 to 8 from examples 1 to 7, in the manner indicated in table 2.

TABLE 2

The Multicoat Paint Systems 2 to 8 of Examples 8 to 14

| Aqueous basecoat material | Example | Multicoat paint system | Example |
|---|---|---|---|
| 2 | 1 | 2 | 8 |
| 3 | 2 | 3 | 9 |
| 4 | 3 | 4 | 10 |
| 5 | 4 | 5 | 11 |
| 6 | 5 | 6 | 12 |
| 7 | 6 | 7 | 13 |
| 8 | 7 | 8 | 14 |

The spray mist bittiness was determined by producing the multicoat paint systems C1 and 2 to 8 in accordance with the following general instructions:

A steel panel measuring 30×50 cm and provided with a surfacer coat was sprayed from a distance of 1.5 meters with a mist of aqueous basecoat material for 30 seconds. After a flash-off time of 2 minutes the aqueous basecoat material was applied in 1.5 spray cross passes, after which the resulting film was flashed off for one minute. Subsequently a further aqueous basecoat material was applied with one spray cross pass. The resulting aqueous basecoat film was flashed off at room temperature for a minute and then dried in a forced-air oven at 70° C. for 10 minutes. Atop the dried aqueous basecoat film there was applied a customary and known two-

TABLE 1

Composition of Aqueous Basecoat Materials (ABCs) 2 to 8 of Examples 1 to 7

| Example/ABC | Solvent (C) (% by weight) | Wetting agent or dispersant (B) (% by weight) |
|---|---|---|
| 1/2 | Triethylene glycol (2) | Starfactant ® 20 from Cognis (hyperbranched polymer) (0.5) |
| 2/3 | gamma-Butyrolactone (2) | Starfactant ® 20 (0.5) |
| 3/4 | N-(2-Hydroxyethyl)-morpholine (2) | Disperbyk ® 182 from Byk Chemie (high molecular mass block copolymer containing groups having pigment affinity) (0.5) |
| 4/5 | 2-Methyl-1-butanol (2) | Byk ® 348 from Byk Chemie (polyether-modified polydimethylsiloxane) (0.5) |
| 5/6 | 2-Methyl-1-butanol (2) | Disperbyk ® 182 |
| 6/7 | N-(2-Hydroxyethyl)-morpholine (3) | Additol ® XW (=395 Byk ® 381 from Byk Chemie) (ionic (meth)acrylate copolymer) (0.5) |
| 7/8 | N-(2-Hydroxyethyl)-morpholine (3) | Efka ® 4580 from Efka (nonionic, high molecular mass addition polymer) (0.5) | component clearcoat material. The aqueous basecoat film and clearcoat film were subsequently cured in a forced-air oven at 140° C. for 20 minutes. The number of spray mist bits in the multicoat paint system was assessed visually. Table 3 gives an overview of the results.

TABLE 3

Spray Mist Bits in the Multicoat Paint Systems

| Example/<br>Comparative<br>Example | Number of spray mist bits | Rating |
|---|---|---|
| C2 | 2 | sat. |
| 8 | 2 | sat. |
| 9 | 1 | sat. |
| 10 | 2 | sat. |
| 11 | 6 | sat. |
| 12 | 4 | sat. |
| 13 | 3 | sat. |
| 14 | 2 | sat. | sat. = satisfactory

The results of table 3 underlined the fact that the organic solvents (C) represented an equivalent substitute for N-methylpyrrolidone. This conclusion was also valid with respect to the wetting of the aqueous basecoats by the clearcoat material.

Preparation Example 2

The Preparation of Aqueous Basecoat Material 9

Aqueous basecoat material 9 was prepared by mixing aqueous basecoat material 1 from preparation example 1 with 2% by weight of Entschäumer T defoamer from Borchers and adjusting the mixture with deionized water to a viscosity of 70 to 75 mPas under a shearing load of 1000/second at 23° C.

Examples 15 to 20

The Preparation of Aqueous Basecoat Materials 10 to 15

Aqueous basecoat materials 10 to 15 were prepared by admixing aqueous basecoat material 9 from preparation example 2 with the organic solvents (C) and wetting agents or dispersants (B) specified in table 4.

The weight percentages in Table 4 are based on the respective aqueous basecoat material.

Examples 21 to 26 (Inventive) and C3 (Comparative)

The Production of Multicoat Paint Systems 10 to 15 of Examples 21 to 26 and of Multicoat Paint System 9 of Example C3

Multicoat paint system 9 of example C3 was produced using aqueous basecoat material 9 from preparation example 2.

Multicoat paint systems 10 to 15 of examples 21 to 26 were produced using aqueous basecoat materials 10 to 15 from examples 15 to 20, in the manner indicated in table 5.

TABLE 5

The Multicoat Paint Systems 10 to 15 of Examples 21 to 26

| Aqueous<br>basecoat material | Example | Multicoat<br>paint system | Example |
|---|---|---|---|
| 10 | 15 | 10 | 21 |
| 11 | 16 | 11 | 22 |
| 12 | 17 | 12 | 23 |
| 13 | 18 | 13 | 24 |
| 14 | 19 | 15 | 25 |
| 15 | 20 | 15 | 26 |

The pinholing limit and the number of pinholes were determined by producing the multicoat paint systems in accordance with the following general instructions:

A steel panel measuring 30×50 cm and coated with a surfacer coat was provided on one long edge with an adhesive strip, in order to allow the film-thickness differences to be determined after coating. The aqueous basecoat material was applied electrostatically in a wedge shape. The resulting aqueous basecoat film was flashed off at room temperature for one minute and then dried in a forced-air oven at 70° C. for 10 minutes. Atop the dried aqueous basecoat film there was applied a customary and known two-component clearcoat material. The resulting clearcoat film was flashed off at room temperature for 20 minutes. Subsequently the aqueous basecoat film and the clearcoat film were cured in a forced-air oven at 140° C. for 20 minutes. After the visual evaluation of the pinholes in the resulting wedged-shaped multicoat paint system, the film thickness of the pinholing limit was determined. The results are given in table 6.

TABLE 4

Composition of Aqueous Basecoat Materials (ABCs) 10 to 15 of Examples 15 to 20

| Example/<br>ABC | Solvent (C)<br>(% by weight) | Wetting agent or dispersant (B)<br>(% by weight) |
|---|---|---|
| 15/10 | Triethylene glycol (2) | Disperbyk ® 182 (1.0) |
| 16/11 | Triethylene glycol (2) | Disperbyk ® 182 (0.5) |
| 17/12 | 2-Methyl-1-butanol (3) | Byk ® 348 (0.5) |
| 18/13 | 2-Methyl-1-butanol (3) | Disperbyk ® 182 (0.5) |
| 19/14 | 2-Methyl-1-butanol (3) | Starfactant ® 20 |
| 20/15 | gamma -Butyrolactone (3) | Disperbyk ® 163 from Byk Chemie<br>(high molecular mass block copolymer containing<br>groups having pigment affinity) |

TABLE 6

Pinholing limit and number of pinholes

| Example | Pinholing limit (μm) | Number of pinholes |
| --- | --- | --- |
| C3 | 10 | 40 |
| 21 | 10 | 3 |
| 22 | 11 | 12 |
| 23 | 12 | 10 |
| 24 | 17 | 1 |
| 25 | 13 | 1 |
| 26 | 11 | 2 |

The results underlined the fact that the organic solvents (C) significantly increased the pinholing limit and at the same time significantly reduced the number of pinholes. Moreover, the aqueous basecoat films of examples 21 to 26 were wetted more effectively with the clearcoat material than the aqueous basecoat film of example C3.

What is claimed is:

1. An aqueous coating material, comprising:
   (A) at least one polyurethane which is ionically stabilized, nonionically stabilized, or a combination thereof, and which is saturated, unsaturated, grafted with olefinically unsaturated compounds, or a combination thereof;
   (B) at least one wetting agent or dispersant; and
   (C) from 0.1 to 10% by weight of at least one organic compound selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, trimethylolpropane, pentaerythritol, sorbitol, glycerol ethoxylate, ethyl 3-ethoxypropionate, gamma-butyrolactone, N-(2-hydroxyethyl) piperidine, N-methylmorpholine, N-(2-hydroxyethyl)morpholine, N-acetylmorpholine, N-cyclohexylpyrrolidone, N-octyl-2-pyrrolidone, and a combination thereof, the % by weight based on the aqueous coating material.

2. The aqueous coating material of claim 1, wherein the at least one organic compound (C) is selected from the group consisting of 2-methyl-1-butanol, 1,6-hexanediol, diethylene glycol, glycerol, triethylene glycol, N-(2-hydroxyethyl)morpholine, glycerol ethoxylate, and a combination thereof.

3. The aqueous coating material of claim 2, wherein the at least one organic compound (C) is triethylene glycol.

4. The aqueous coating material of claim 1, wherein the at least one wetting agent or dispersant (B) is selected from the group consisting of hyperbranched polymers, polyether-modified polydimethylsiloxanes, ionic and nonionic (meth)acrylate copolymers, high molecular mass block copolymers containing groups having pigment affinity, and dialkylsulfosuccinates.

5. The aqueous coating material of claim 4, wherein the at least one wetting agent or dispersant (B) is a hyperbranched polymer.

6. The aqueous coating material of claim 1, wherein the at least one polyurethane (A) comprises alternatively:
   (a1) functional groups which can be converted into cations by neutralizing agents, quaternizing agents, cationic groups, or a combination thereof;
   (a2) functional groups which can be converted into anions by neutralizing agents, anionic groups, or a combination thereof;
   (a3) nonionic hydrophilic groups; or
   a combination thereof.

7. The aqueous coating material of claim 1, further comprising at least one additive (D).

8. The aqueous coating material of claim 7, wherein the at least one additive (D) is selected from the group consisting of salts which can be decomposed thermally without residue, salts which can be decomposed thermally substantially without residue; binders curable physically that are different from the at least one polyurethane (A), binders curable thermally that are different from the at least one polyurethane (A), binders curable with actinic radiation that are different from the at least one polyurethane (A); crosslinking agents; organic solvents other than the at least one organic solvent (C); thermally curable reactive diluents; reactive diluents curable with actinic radiation; color pigments, effect pigments; transparent pigments; fillers; molecularly dispersely soluble dyes; nanoparticles; light stabilizers; antioxidants; devolatilizers; emulsifiers; slip additives; polymerization inhibitors; free-radical polymerization initiators; thermolabile free-radical initiators; adhesion promoters; flow control agents; film-forming assistants, rheology assistants; corrosion inhibitors; free-flow aids; waxes; siccatives; biocides; matting agents, and a combination thereof.

9. A process for preparing the aqueous coating material of claim 1, comprising:
   mixing:
   (A) at least one polyurethane which is ionically stabilized, nonionically stabilized, or a combination thereof, and which is saturated, unsaturated, grafted with olefinically unsaturated compounds, or a combination thereof;
   (B) at least one wetting agent or dispersant; and
   (C) at least one organic compound selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, triethylene glycol, glycerol, solutions of trimethylolpropane, pentaerythritol, sorbitol, glycerol ethoxylate, ethyl 3-ethoxypropionate, gamma-butyrolactone, N-(2-hydroxyethyl)piperidine, N-methylmorpholine, N-(2-hydroxyethyl)morpholine, N-acetylmorpholine, N-cyclohexylpyrrolidone, N-octyl-2-pyrrolidone, and a combination thereof;
   and optionally
   (D) at least one additive;
   with water; and
   homogenizing the resulting mixture.

10. Thermoplastic or thermoset material comprising the aqueous coating material of claim 1.

11. The thermoplastic or thermoset material of claim 10 that is a coating, an adhesive layer, a seal, a sheet or a molding.

12. The thermoplastic or thermoset material of claim 11 that is produced on or in a primed or an unprimed substrate.

13. The thermoplastic or thermoset material of claim 12 that is a coating.

14. The thermoplastic or thermoset material of claim 13 wherein the coating is an aqueous basecoat material used for producing a multicoat color and/or effect paint system.

15. The thermoplastic or thermoset material of claim 1, wherein the multicoat color and/or effect paint system is produced by a wet-on-wet method.

16. The thermoplastic or thermoset material of claim 12, wherein the substrate is an automobile.

17. An aqueous coating material, comprising:
    (A) at least one polyurethane which is ionically stabilized, nonionically stabilized, or a combination thereof, and which is saturated, unsaturated, grafted with olefinically unsaturated compounds, or a combination thereof;
    (B) at least one wetting agent or dispersant; and (C) from 0.1 to 10% by weight of at least one organic compound selected from the group consisting of dimethyl sulfoxide, sulfolane, 2-methyl-1-butanol, 3-methyl-1-butanol, 2-methyl-1-pentanol, hexyl glycol, 1,6-hexanediol, diethylene glycol, glycerol, trimethylolpropane, pentaerythritol, sorbitol, glycerol ethoxylate, ethyl 3-ethoxypropionate, gamma-butyrolactone, N-(2-hydroxyethyl)piperidine, N-methylmorpholine, N-(2-hydroxyethyl)morpholine, N-acetylmorpholine, N-cyclohexylpyrrolidone, N-octyl-2-pyrrolidone, and a combination thereof, the % by weight based on the aqueous coating material.

18. The aqueous coating material of claim 1, wherein the at least one organic compound (C) is selected from the group consisting of 2-methyl-1-butanol, N-(2-hydroxyethyl)morpholine, gamma-butyrolactone, and a combination thereof.

* * * * *